Dec. 3, 1963  J. C. CHUPA  3,112,529
APPARATUS FOR FORMING HOLLOW ARTICLES
Filed Sept. 16, 1954  7 Sheets-Sheet 1
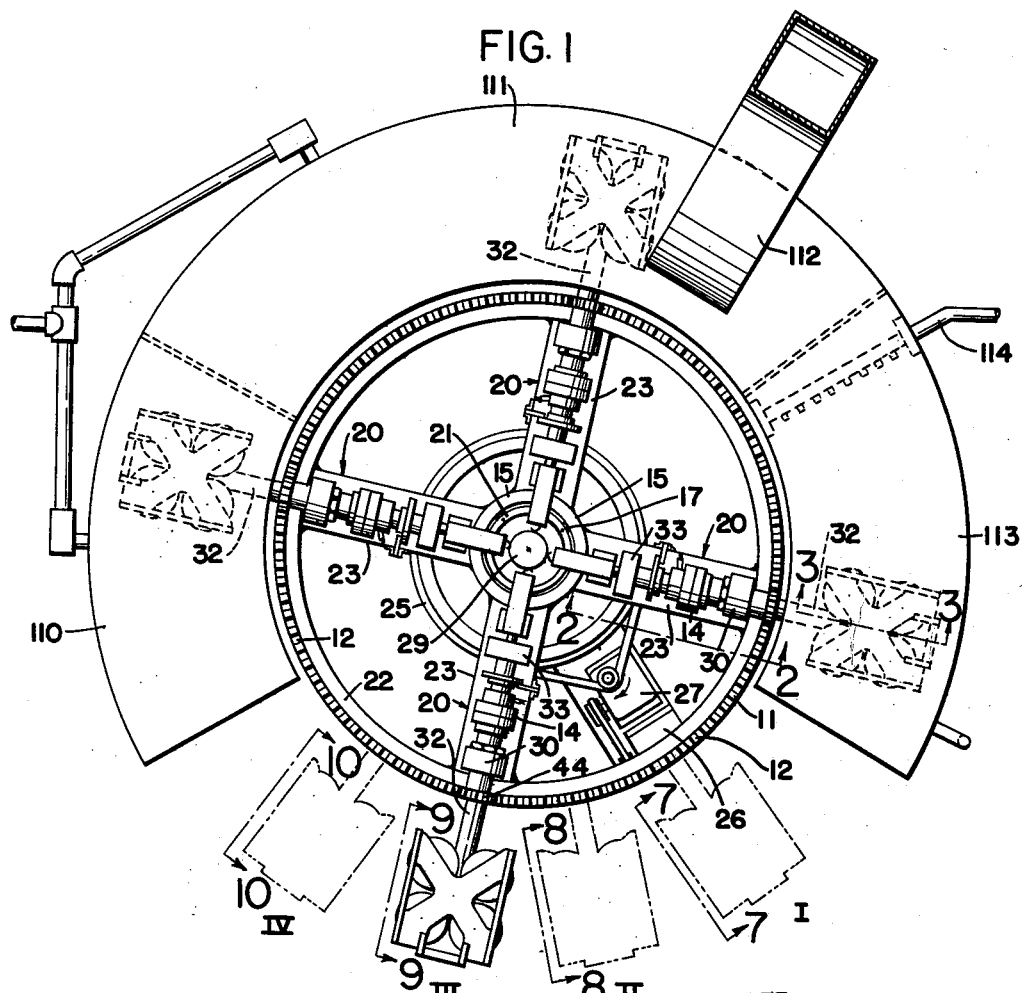
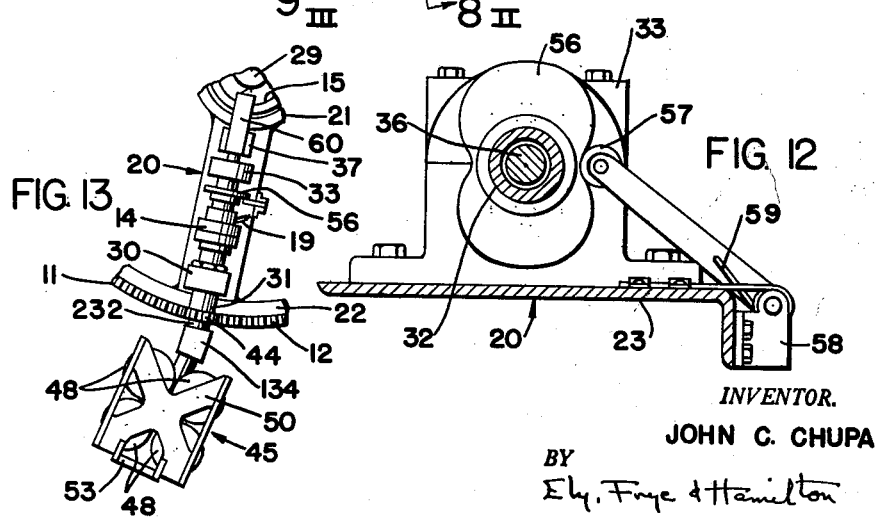
INVENTOR.
JOHN C. CHUPA
BY
Ely, Frye & Hamilton
ATTORNEYS Dec. 3, 1963   J. C. CHUPA   3,112,529
APPARATUS FOR FORMING HOLLOW ARTICLES
Filed Sept. 16, 1954   7 Sheets-Sheet 2

INVENTOR.
JOHN C. CHUPA
BY
Ely, Frye & Hamilton
ATTORNEYS

Dec. 3, 1963 J. C. CHUPA 3,112,529
APPARATUS FOR FORMING HOLLOW ARTICLES
Filed Sept. 16, 1954 7 Sheets-Sheet 3

INVENTOR.
JOHN C. CHUPA
BY
Ely, Frye & Hamilton
ATTORNEYS

Dec. 3, 1963  J. C. CHUPA  3,112,529
APPARATUS FOR FORMING HOLLOW ARTICLES
Filed Sept. 16, 1954  7 Sheets-Sheet 4

INVENTOR.
JOHN C. CHUPA
BY
Ely, Frye & Hamilton
ATTORNEYS

Dec. 3, 1963  J. C. CHUPA  3,112,529
APPARATUS FOR FORMING HOLLOW ARTICLES
Filed Sept. 16, 1954  7 Sheets-Sheet 5
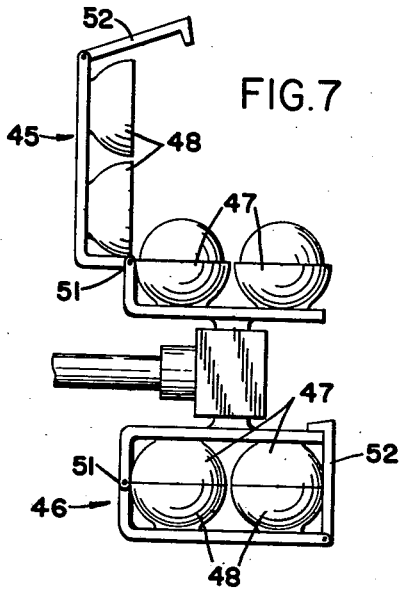
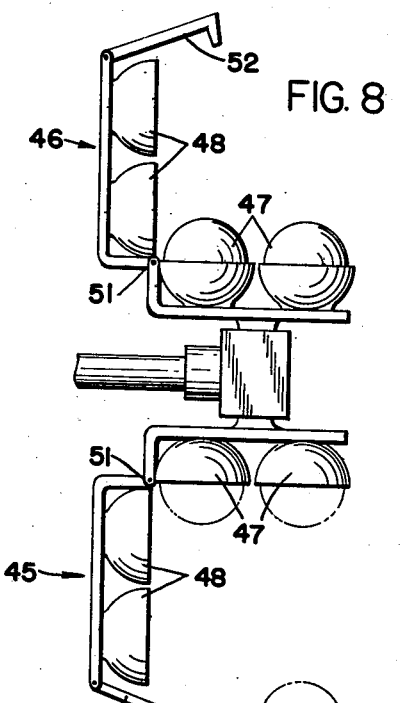
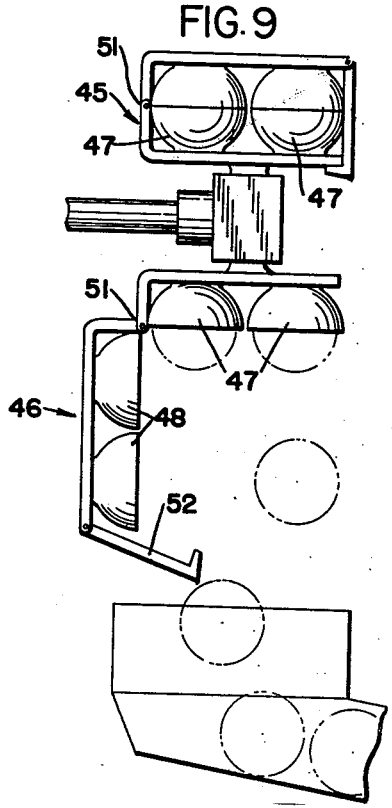
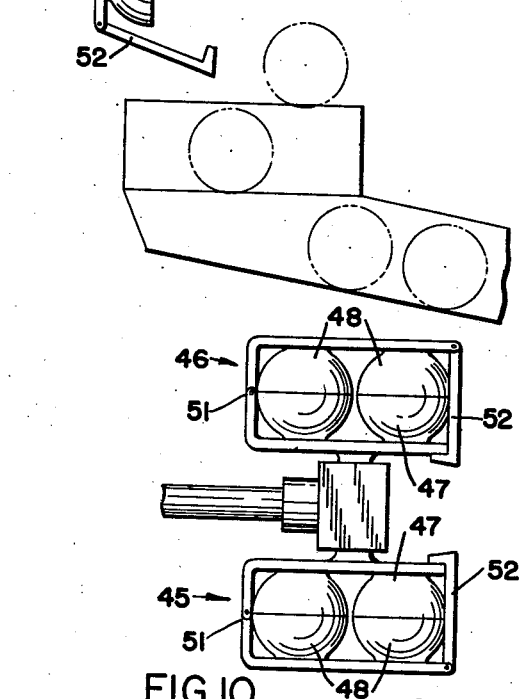
INVENTOR.
JOHN C. CHUPA
BY
Ely, Frye & Hamilton
ATTORNEYS Dec. 3, 1963  J. C. CHUPA  3,112,529
APPARATUS FOR FORMING HOLLOW ARTICLES
Filed Sept. 16, 1954  7 Sheets-Sheet 6

INVENTOR.
JOHN C. CHUPA
BY Ely, Frye & Hamilton
ATTORNEYS

Dec. 3, 1963   J. C. CHUPA   3,112,529
APPARATUS FOR FORMING HOLLOW ARTICLES
Filed Sept. 16, 1954   7 Sheets-Sheet 7
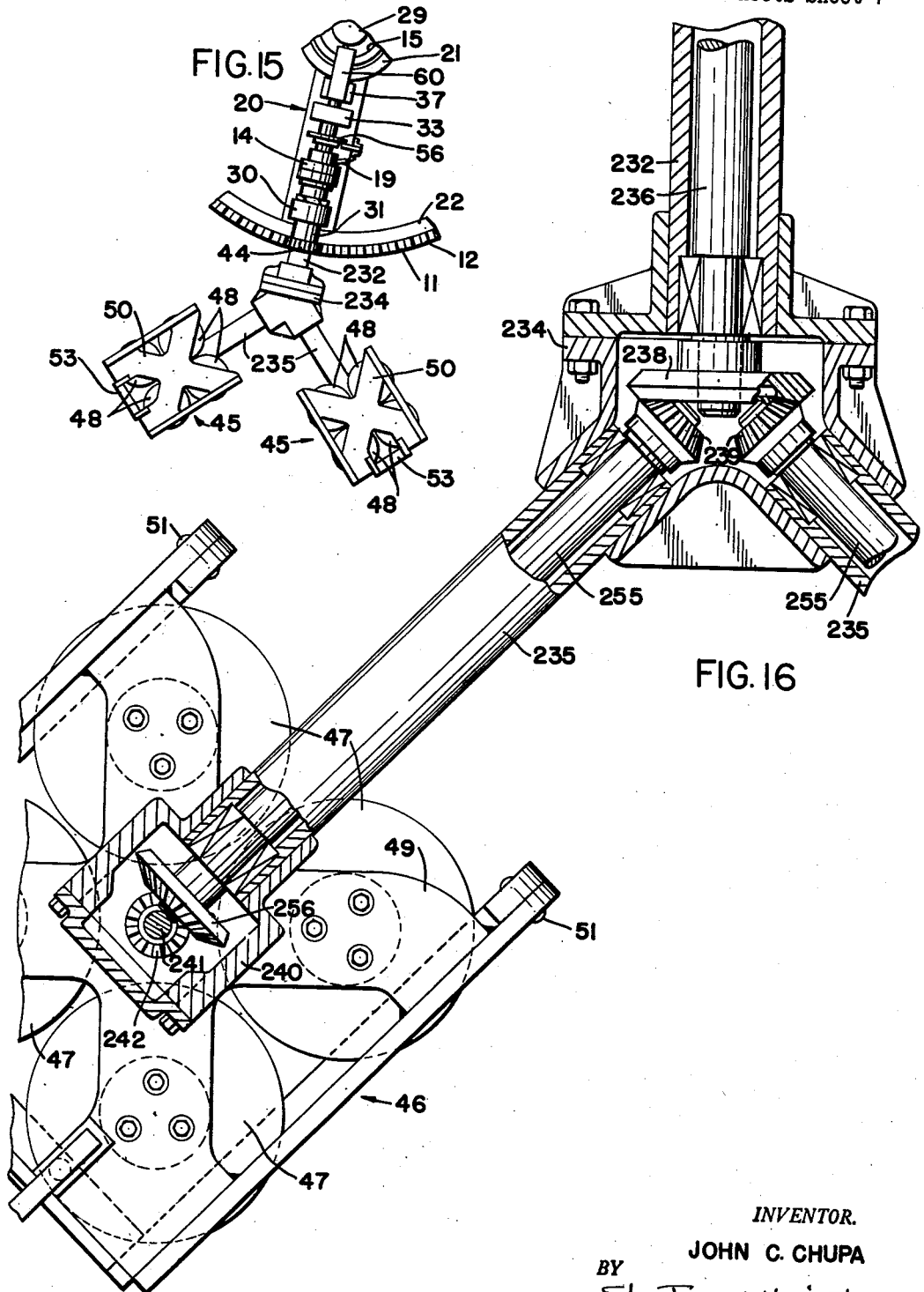
INVENTOR.
JOHN C. CHUPA
BY
Ely, Frye & Hamilton
ATTORNEYS

United States Patent Office 3,112,529
Patented Dec. 3, 1963

3,112,529
APPARATUS FOR FORMING HOLLOW ARTICLES
John C. Chupa, Sandusky, Ohio, assignor to The Barr Rubber Products Company, Sandusky, Ohio, a corporation of Ohio
Filed Sept. 16, 1954, Ser. No. 456,573
6 Claims. (Cl. 18—26)

The present invention relates to apparatus for the manufacture of hollow articles from plastic materials by what may be termed the rotational casting process. In this type of molding operation, a hollow mold is loaded with a charge of plastic material, most conveniently in liquid or semi-liquid form, and the mold is rotated upon itself in a plurality of planes so that the material distributes itself, generally, to an even thickness over the interior of the mold or matrix and gels on the interior of the matrix in such distributed condition. The gelled skin or shell is then fused, usually by heat, to finally form the molded article. In the practice of this type of molding operation, various types of plastic materials or resins may be employed. At the present time, it is the common practice to employ vinyl resins which are polymers of vinyl chloride combined with suitable plasticizers, but it will be understood that other materials suitable for the purposes may be employed in the illustrated invention, including cold-setting materials. With such materials, heating and cooling of the molds may be entirely omitted.

The purpose of the present invention is to provide a machine for high volume production of articles by the rotational casting process which is far more simple and more versatile than those of the prior art. Machines with the same general objects as those of the present invention have been suggested in the prior art, but those which have proven satisfactory for high volume production have proven most unsatisfactory from the standpoint of maintenance costs and adaptability to quick changeover. This has been a particular handicap in connection with production of articles in the toy field, where a given model or design may often be produced in quantity only for a short time before it must be succeeded by a redesigned product more appropriate to the constantly changing demands and tastes so characteristic of this industry.

The present invention is particularly advantageous in that it is relatively compact and is so constructed and arranged that model changeover may be accomplished by merely changing a few molds and also making a few timing adjustments if this appears necessary.

While a machine employing the invention is illustrated in great detail, in order that the machine may be thoroughly understood, many of the illustrated details are not necessary to the invention, and changes, modifications and improvements may be adopted without departing from the general scope of the invention, as defined in the appended claims.

In the drawings,

FIGURE 1 is a plan view of an installation of the class in which mechanism made according to this invention may be embodied;

Figure 2:
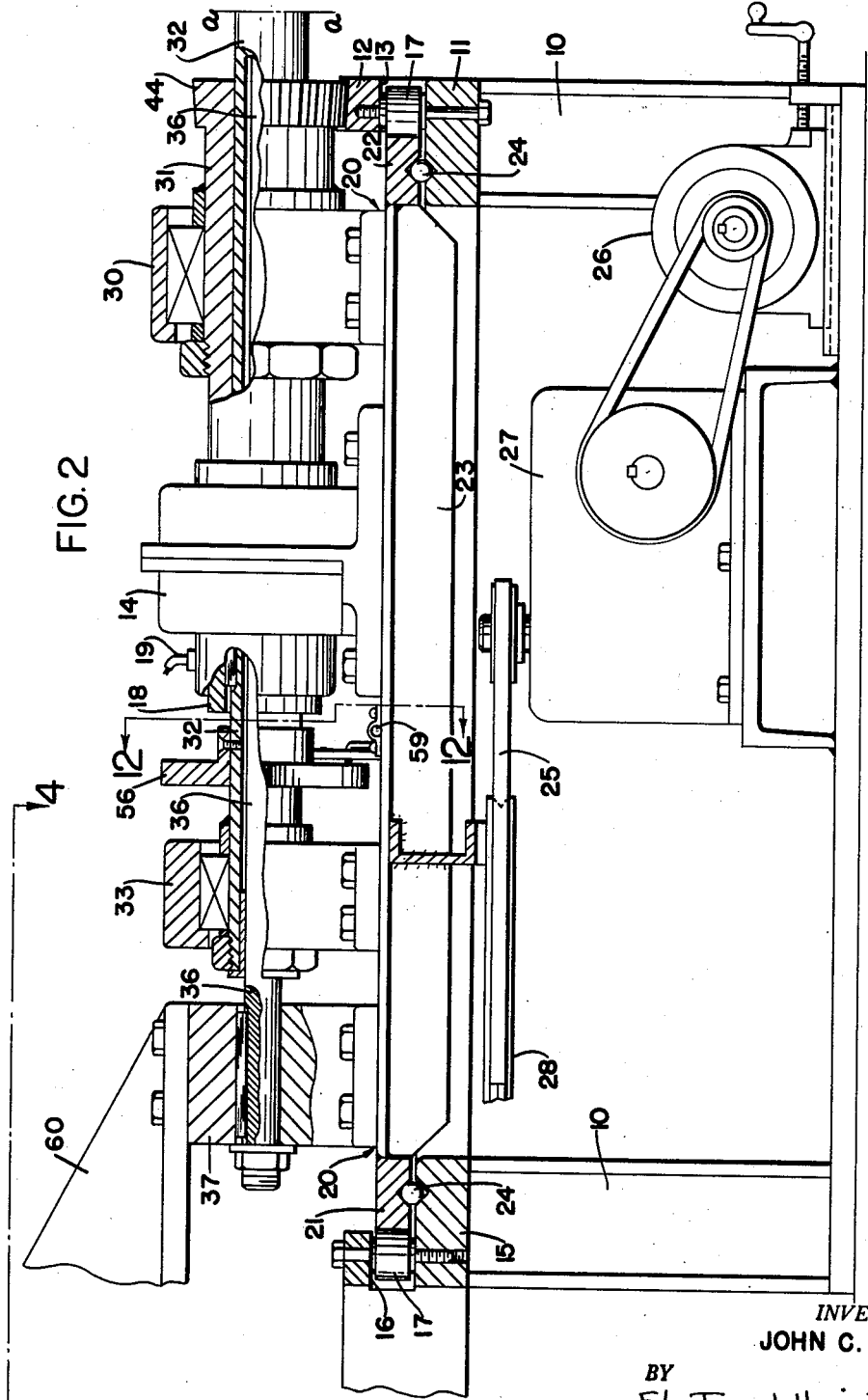
FIGURE 2 is a fragmentary view, partly broken away, taken from plane 2—2 in FIGURE 1, the power drive units having been rotated into the plane of the paper for greater simplicity of illustration, this view being on an enlarged scale, and alternative positions of certain elements being shown in phantom.
Figure 4:
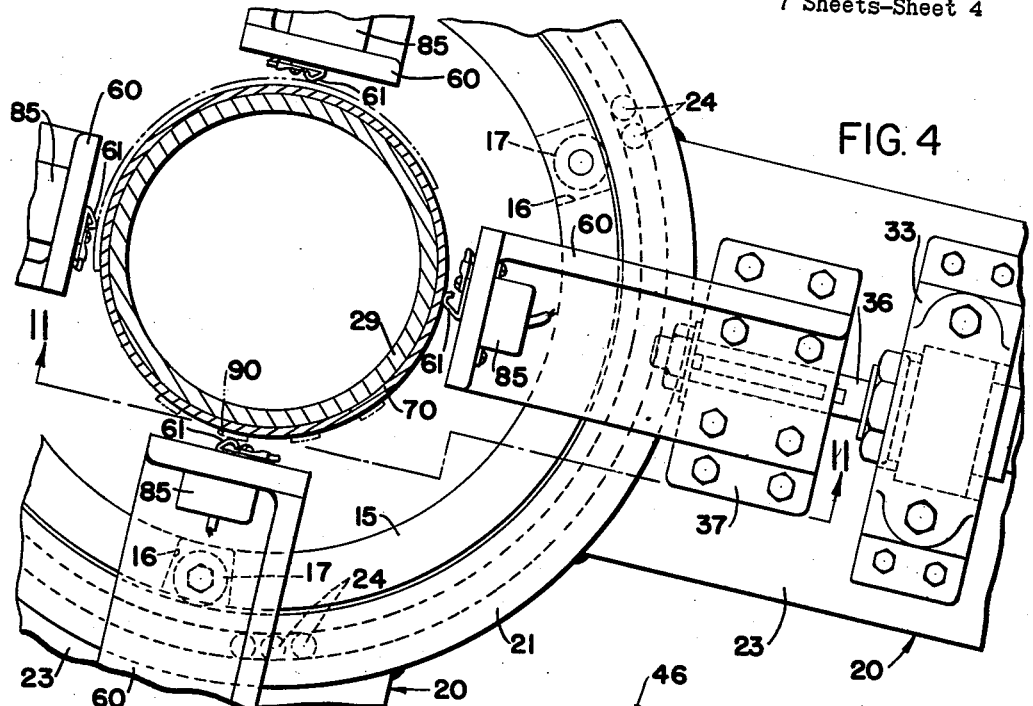
FIGURE 4 is a fragmentary view taken from plane 4—4 in FIGURE 2.
Figure 5:
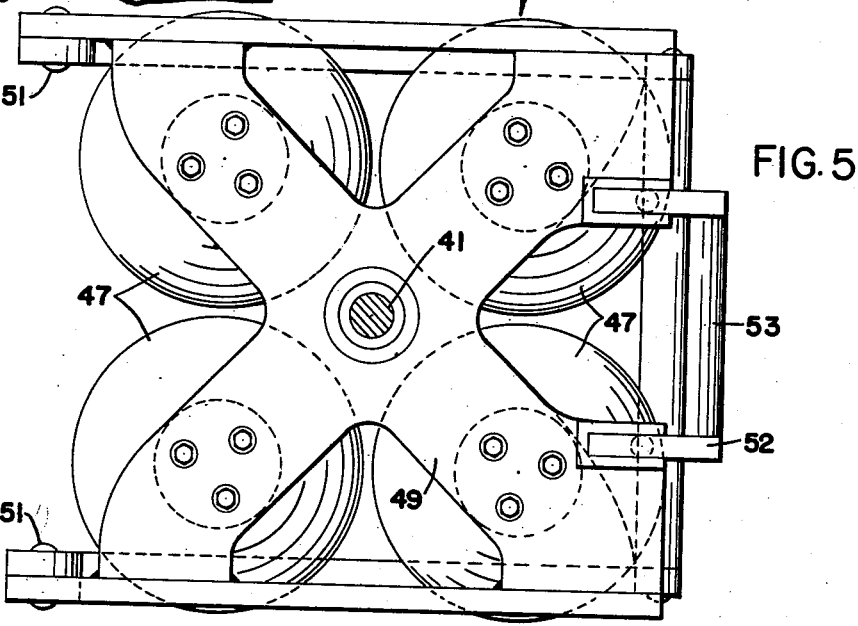
FIGURE 5 is a view taken from line 5—5 in FIGURE 3.
Figure 11:
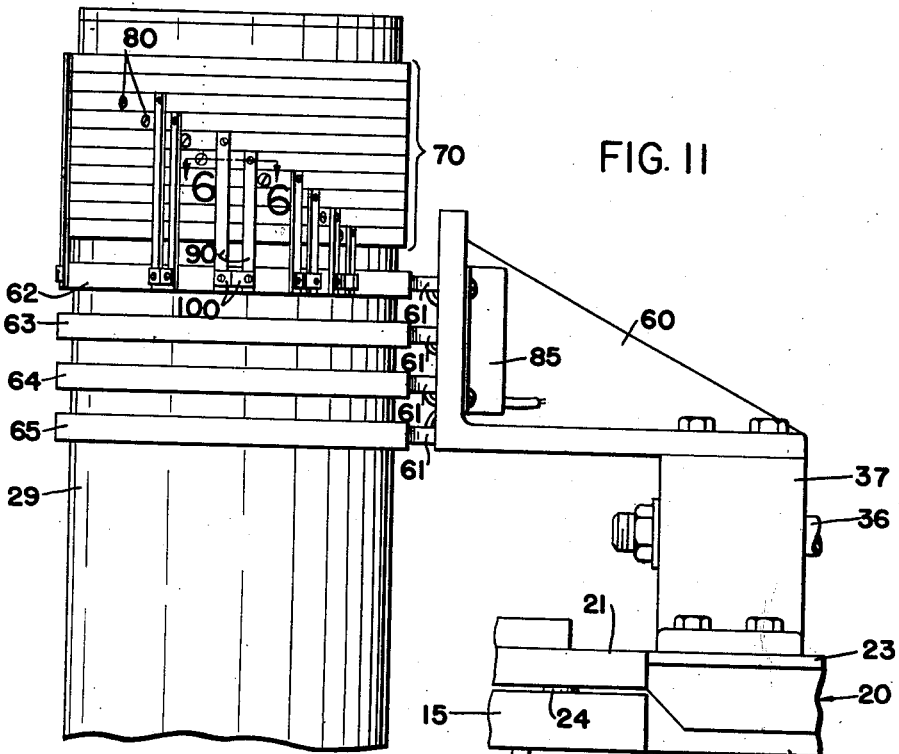
Figure 14:
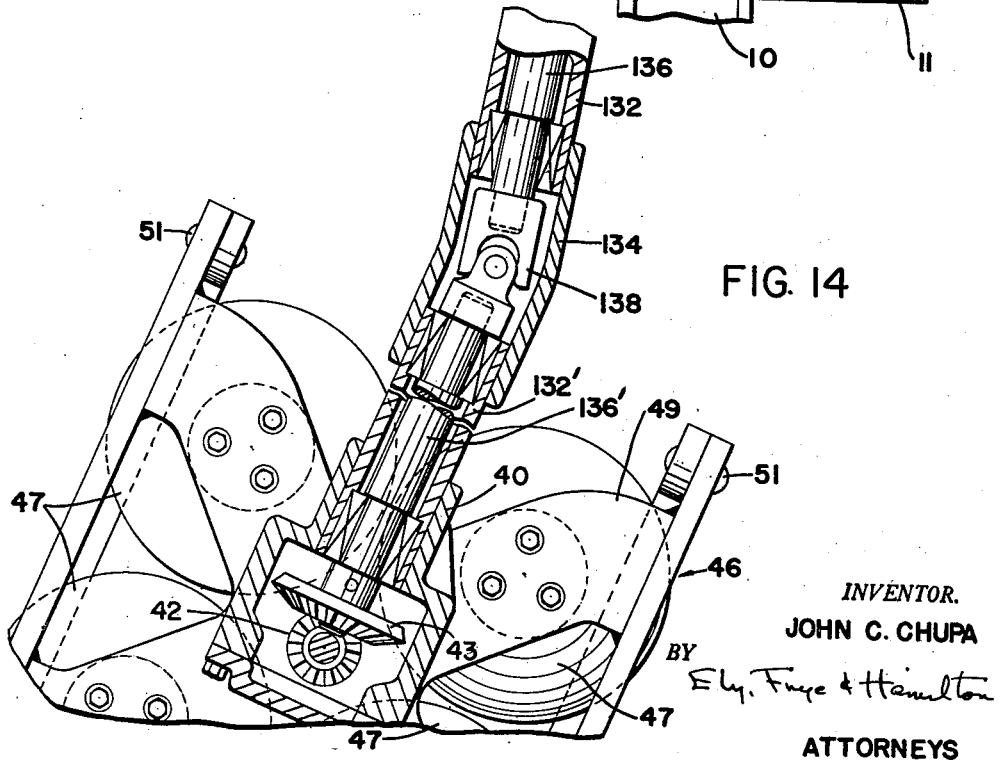

FIGURES 7, 8, 9 and 10 are views on an intermediate scale taken from planes 7—7, 8—8, 9—9 and 10—10, respectively, in FIGURE 1, it being understood that FIGURES 7, 8 and 10 are treated as if the pertinent elements were actually in the appropriate position shown in phantom in FIGURE 1;

FIGURE 11 is a view taken from line 11—11 in FIGURE 4;

FIGURE 12 is a view taken from line 12—12 in FIGURE 2;

FIGURE 13 is a fragmentary plan view of an alternative to a portion of the installation shown in FIGURE 1;

FIGURE 14 is a fragmentary cross-section, on an enlarged scale, of the mechanism shown in FIGURE 13;

FIGURE 15 is a fragmentary plan view of another alternative to a portion of the installation shown in FIGURE 1;

FIGURE 16 is a fragmentary cross-section, on an enlarged scale, of the mechanism shown in FIGURE 15.

Frame Assembly

In the embodiment shown in FIGURES 1 to 12, there is provided a fixed frame 10, which includes an outer circular beam 11, which is L-shaped in cross-section and provided with notches 13, the uppermost flange of the L cross-section comprising a rack 12. Also associated with the frame 10 is an inner circular beam 15 provided with notches 16 similar to the notches 13. Positioned for rotation in the notches 13 and 16 are a plurality of guide rollers 17.

A rotating frame assembly 20 is supported on the frame 10 by ball bearings 24, which move in raceways formed on the fixed frame 10 and the rotating frame 20, as shown in FIGURES 2 and 4. The rotating frame 20 comprises an inner circular beam 21, an outer circular beam 22 and a plurality of radial beams 23, each associated with a rotational casting assembly to be described below. The rotating frame 20 is provided with a large sheave 28 supported beneath the radial beams. Power is supplied to the rotating frame from a motor 26 through a speed reducer 27 and a belt 25, which engages the sheave 28.

Rotational Casting Assemblies

As shown in FIGURE 2, each rotational casting assembly comprises a bearing block 30 in which is rotatably mounted an outer spindle 31, the outer end of which is cut as a gear 44 adapted to mesh with the rack 12. Rotatably supported within the spindle 31 is a sleeve 32 which may have an enlarged central portion 18. The opposite end of the sleeve 32 is supported in a bearing block 33. The sleeve 32 is free to rotate about a central shaft 36, which is supported within the sleeve 32 and which is keyed to a post 37, so that the shaft 36 is held against rotation. The shaft 36 and the sleeve 32 extend completely through a central clutch 14, which is of any suitable conventional construction, and, in the present embodiment, is a magnetic clutch controlled by input voltage through the cable 19. The clutch is adapted and arranged in any conventional manner to releasably couple the spindle 31 and the enlarged portion 18 of the sleeve 32. As is conventional in this type of clutch, the clutch is engaged when voltage is applied through the cable 19 to orient the magnetic particles making up the coupling between the input and output members.

Figure 3:
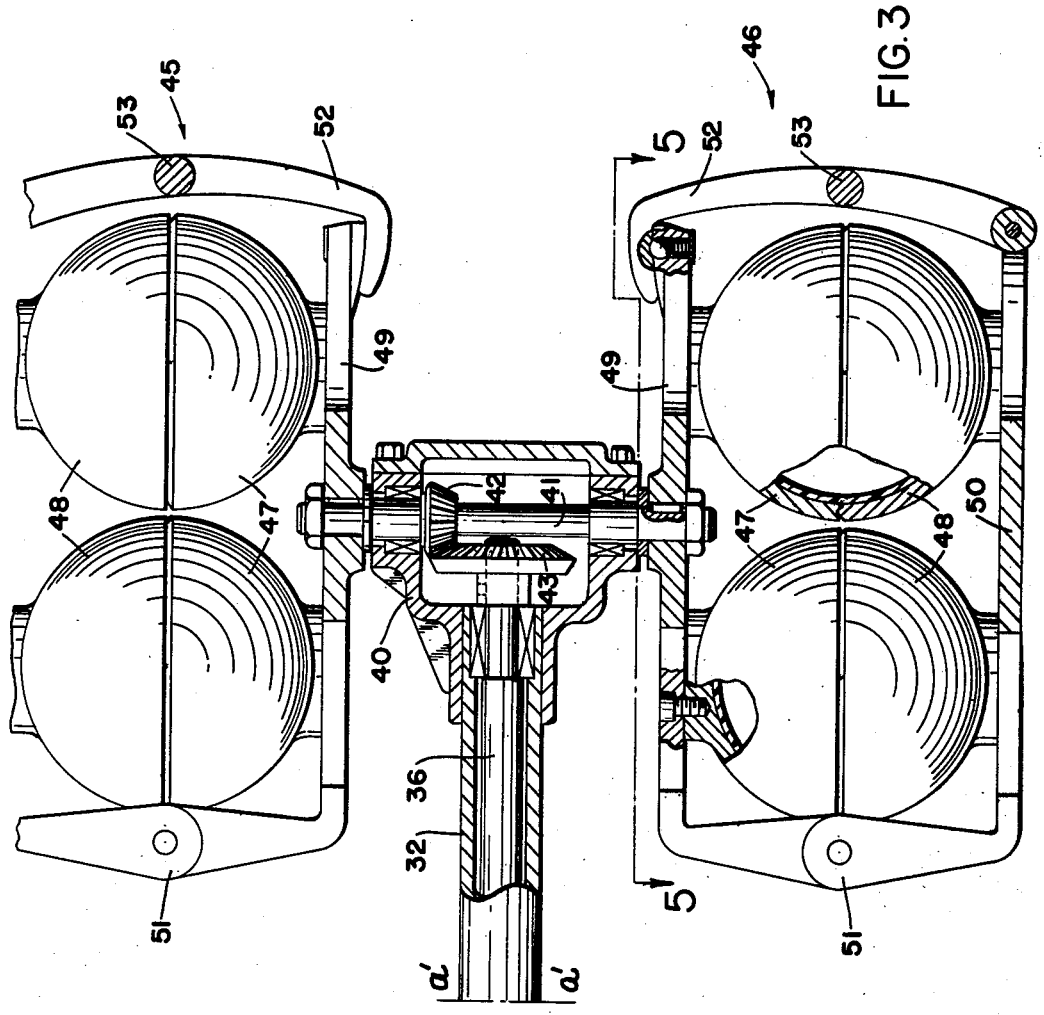
FIGURE 3 is a fragmentary view, partly broken away, taken from plane 3—3 in FIGURE 1, it being understood that the break-off lines a—a and a'—a' in FIGURES 2 and 3, respectively, coincide.

At its outer end, the sleeve 32 carries a housing 40 in which is rotatably mounted a transverse stub shaft 41, as shown in FIGURE 3. Mounted on the stub shaft 41 is a bevel gear 42 which is in engagement with a bevel gear 43 fixed to the outer end of the shaft 36. Mounted at opposite ends of the stub shaft 41 are mold assemblies 45 and 46, each of which comprises inner mold sections 47 and outer mold sections 48, the inner mold sections being mounted on plates 49, and the outer mold sections being mounted on plates 50. The plates 49 and 50 are hinged together by the hinge structures 51. Each pair of plates 49, 50 is provided with a latch 52, which may be closed and released manually by employing the handle 53.

As shown in FIGURES 2 and 12, a cam 56 in mounted for rotation with the sleeve 32. A follower detent 57 is pivoted on a suitable bracket 58 fixed to the radial beam 23. The follower detent is urged into following position by a spring 59. The conformation of the cam 56 is such that, when either of the mold assemblies 45 or 46 is at uppermost position, the follower detent 57 is at one of the two low points of the cam profile.

*Power-Stop Control*

Figure 6:
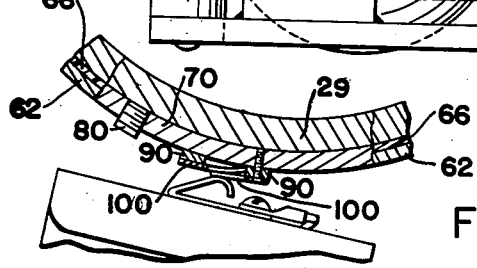
FIGURE 6 is a view on a further enlarged scale taken from line 6—6 in FIGURE 11.

A center post 29 extends upwardly through the center of the fixed frame 10 and the rotating frame 20. Mounted on the center post 29 are a plurality of distributing rings 62, 63, 64, and 65 (FIGURE 11) which are insulated from the post 29 by suitable installation means 66 (FIGURE 6). These rings are engaged by sliding contacts 61 mounted on brackets 60; each bracket 60 is supported, in turn, on one of the positions 37 associated with rotational casting assembly. The upper portion of the center post 29 is provided with a plurality of adjusting rings 70, each provided with a stop-screw 80 to allow selective angular positioning of each of these rings.

The rings 70 are provided with associated depending fingers 90. The depending fingers 90 are associated in pairs in a manner which will be clear from FIGURE 11. The lower ends of the depending fingers are provided with insulating leaves 100, the insulating leaves for each associated pair of fingers overlapping each other as shown in FIGURE 6. The degree of overlapping is adjusted by angularly shifting the adjusting rings associated with the particular pair of overlapping leaves.

This adjustment determines which segments of the distributing ring 62 are engaged by the sliding contacts associated with this ring. The rings 62 and 63 represent the line and ground side of a low voltage circuit for each of the rotational casting assemblies. Each low voltage circuit controls a relay 85, which, in turn, controls the higher voltage clutch operating circuit. This latter circuit is supplied from the rings 64 and 65.

*Modification of FIGURES 13 and 14*

The modification of FIGURES 13 and 14 is in all respects similar to the structure described above, except that in each rotational casting assembly the sleeve 132 is provided with an outer section 132' carrying the housing 40, the two sleeve sections 132 and 132' being joined at an obtuse angle by an elbow 134. Likewise, the inner center shaft 136 is provided with an outer extension shaft 136' suitably journaled in the outer sleeve section 132' and connected for angular movement with respect to the restrained inner shaft 136 by a universal joint 138. The bevel gear 43 is fixed to the outer end of the center shaft extension 132' for engagement with the stub shaft bevel gear 42 within the housing 40 in the same fashion as shown in FIG. 3.

*Modification of FIGURES 15 and 16*

The modification of these figures is also generally similar to the apparatus illustrated in FIGURES 1–12. However, in the present modification, the sleeve 232 terminates in a first housing 234, from which, in this specific modification, a pair of outer extension sleeves 235 are carried. Each outer extension sleeve 235 is joined to the sleeve 232 at an obtuse angle by the first housing 234. The outer end of each extension sleeve carries a housing 240 similar to the housing 40. A stub shaft 241 is received in each housing 240 and is provided with a bevel gear 242. The stub shafts 241 each rotatably support a pair of mold assemblies similar to the mold assemblies 45 and 46.

The central shaft 236 terminates within the first housing 234 and is provided with a bevel gear 238, which meshes with a pair of bevel gears 239, each on one of a pair of extension shafts 255, each extension shaft 235 being rotatably mounted within one of the pair of extension sleeves 235. Bevel gears 256, one on the outer end of each of the extension shafts 255, mesh with the bevel gears 242 on the stub shafts 241.

*General Organization*

As shown in FIGURE 1, the mold assemblies associated with each rotational casting assembly are carried past emptying and reloading stations I, II, III and IV, then through a preheating tunnel 110 and a heating tunnel 111, which may be provided with suitable duct means 112. The mold assemblies then complete a cycle by passing through a cooling chamber 113, which may employ a cold water spray 114.

*Operation*

As the mold assemblies associated with each rotational casting assembly proceed through the distributing and setting portion of the cycle, they are rotated in a plurality of planes through the interaction of the gear 44 and rack 12, on the one hand, and the gears 42 and 43 on the other hand. The mold assemblies are rotated around a horizontal axis by bodily rotation of the sleeve 32 and housing 40. However, since the shaft 36 remains fixed, the stub shaft 41 is caused to rotate so that the mold assemblies simultaneously rotate around an axis normal to the horizontal axis of rotation. During this rotation in a plurality of planes, the clutch 14 is engaged.

When the mold assembly in question approaches station I, the associated sliding contact 61 passes over a pair of overlapping insulating leaves 100, causing the clutch 14 to be disengaged. Upon such disengagement, indexing of one of the mold assemblies 45 or 46 in uppermost position is assured by the interaction of the cam 56 and follower detent 57. It will be understood that angular positioning of the overlapping insulating leaves is sufficiently accurate to bring the follower detent 57 at least within the range of the desired one of the depressed portions on the cam 56.

Assuming that mold assembly 45 is in uppermost position at station I, this particular assembly is manually released to its open position at this station by an operator, as indicated in FIGURE 7. After a certain dwell, the sliding contact positioning is such that the mold assemblies 45 and 46 are rotated approximately 180° to be thereupon indexed at exactly an 180° advancement with assembly 46 in uppermost position at station II, as shown in FIGURE 8. The assembly 46 is manually opened while simultaneously the assembly 45 is emptied by gravity. After a short dwell, the mold assemblies are again advanced 180° to station III, as shown in FIGURE 9. At this station, the assembly 46 empties, and the then bottom section of each mold in the still open assembly 45 is filled with a charge of material, and assembly 45 is manually closed by the operator. The mold assemblies are then advanced a final 180° to station IV, as shown in FIGURE 9, at which station the then bottom section of each mold in the still open assembly 46 is filled with a charge of material, and assembly 46 is manually closed by the operator. Thereupon, rotation of the molding assemblies is initiated for the distributing and setting operation.

In some applications, it may be desirable to provide for additional dwell periods other than those at the filling and emptying stations. For example, it may be desirable to stop rotation of the molds during a portion of their travel into the heating tunnels. Accordingly, in FIGURE 11, the topmost pair of adjusting rings 70 are shown, together with their associated elements, it being apparent from this figure and from FIGURE 4 that such associated elements are angularly spaced around the center post 29 in a position corresponding to the heat-treating station.

The operation of the embodiment shown in FIGURES 13 and 14 is generally similar to that described above, except that the bend at the elbow 134 imparts a wobbling motion to the mold assemblies as they are rotated. This wobbling motion has been found to improve the distribution of the molding material in many applications. Indexing of the assemblies is such that the outer portion of each sleeve 132 is in horizontal position during dwell, so that the associated mold assemblies are in level position during dwell at the loading and unloading stations.

The embodiment shown in FIGURES 15 and 16 is also similar in operation to the embodiment shown in FIGURES 1–12. However, it will be noted that, in the embodiment in FIGURES 15 and 16, while the shaft 236 is fixed relative to the rotating frame 20, the shafts 255 turn about their own axes. It will be apparent, however, that their rate of rotation is different from that of the sleeves 235. This difference in rate of rotation results in an interaction between the gears 242 and 256 such as to cause rotation of the stub shafts 241.

The several presently preferred modifications of the invention, which have been specifically described above by way of example, will make it apparent that many details of apparatus embodying the invention may be varied without departing from the teaching of the invention. Accordingly, the scope of the invention is not to be limited to precise details of the specifically described embodiments, but is to be defined by the following claims:

What is claimed is:

1. In a machine for casting hollow articles in a matrix, conveying means, an inner shaft restrained against free rotation with respect to the conveying means, an inner shaft extension coupled to said inner shaft through a universal joint, a sleeve around said inner shaft, a sleeve extension around said inner shaft extension, an obtuse elbow between said sleeve and said sleeve extension, a structure fixed for movement bodily with said sleeve extension, a matrix mounting stub shaft rotatably supported in said structure and extending transversely to both said sleeve and said sleeve extension, interengaging gear means fixed to said inner shaft extension and said stub shaft to cause rotation of said mounting shaft about its own axis upon rotation of said sleeve shaft with respect to the conveying means, matrix means mounted on said stub shaft, and drive means engageable and disengageable with said sleeve to rotate it with respect to said conveying means.

2. In a machine for casting hollow articles in a matrix, conveying means, an inner shaft fixed against rotation with respect to the conveying means, an inner shaft extension coupled to said inner shaft through a universal joint, a sleeve around said inner shaft, a sleeve extension around said inner shaft extension, an obtuse elbow connecting said sleeve and said sleeve extension, a structure fixed for movement bodily with said sleeve extension, a matrix mounting stub shaft rotatably supported in said structure and extending transversely to both said sleeve and said sleeve extension, interengaging gear means fixed to said inner shaft extension and said stub shaft to cause rotation of said stub shaft about its own axis upon rotation of said sleeve with respect to the conveying means, matrix means mounted on said stub shaft, drive means engageable and disengageable with said sleeve to rotate it with respect to said conveying means, and detent means to index the angular position of said sleeve when it is disengaged from said drive means to positions at which said sleeve extension is substantially horizontal.

3. A machine for casting hollow articles in a matrix comprising a turntable, means to drive the turntable, at least one inner shaft extending radially on the turntable and fixed against rotation relative to the turntable, an inner shaft extension coupled to said inner shaft through a universal joint, a sleeve around said inner shaft, a sleeve extension around said inner shaft extension, an obtuse elbow between said sleeve and said sleeve extension, a power spindle around said sleeve and coaxial therewith, means to drivingly engage said power spindle to rotate said power spindle abouts its axis during rotation of the turntable, clutch means between said power spindle and said sleeve to releasably couple them for rotation together, a structure fixed for movement bodily with said sleeve extension, a matrix mounting stub shaft rotatably supported in said structure and extending transversely to both said sleeve and said sleeve extension, interengaging gear means fixed to said inner shaft extension and said stub shaft to cause rotation of said stub shaft about its own axis upon rotation of said sleeve with respect to the turntable, matrix means mounted on said stub shaft, and detent means to index the angular position of said sleeve when said clutch means is disengaged to positions at which said sleeve extension is substantially horizontal.

4. A machine for casting hollow articles in a matrix comprising a turntable, means to drive the turntable, at least one inner shaft extending radially on the turntable and fixed against rotation relative to the turntable, a sleeve around said inner shaft, said sleeve being rotatably mounted with respect to said turntable, a hollow power spindle around said sleeve and coaxial therewith, means to drivingly engage said power spindle to rotate said power spindle about its axis during rotation of the turntable, clutch means between said power spindle and said sleeve to releasably couple them for rotation together, a structure supported by said sleeve for rotation therewith, a shaft extension rotatably supported in said structure at an obtuse angle to said inner shaft, interengaging gear means fixed to said inner shaft and said shaft extension to cause rotation of said shaft extension about its own axis when said clutch means is engaged while simultaneously allowing bodily rotation of said shaft extension together with said structure around the axis of said sleeve, detent means to index the angular position of said sleeve when said clutch means is disengaged, a stub shaft extending at an angle divergent to said inner shaft and said shaft extension, drive means connecting said stub shaft to said inner shaft extension, matrix means mounted on said stub shaft, and means supporting said stub shaft so that its axis is fixed relative to the axis of said sleeve.

5. Apparatus for simultaneously supporting and rotating a mold about a plurality of axes, said apparatus comprising a continuous and hollow shaft having a first portion rotatable about its own axis and a second portion rigidly attached to and extending beyond said first portion at an angle acute to such axis, said second portion terminating in a housing, a non-rotatable shaft extending axially within said first portion, an intermediate shaft mounted in said second portion, a universal coupling connecting said non-rotatable and intermediate shafts, a mold supporting spindle rigidly mounted in said housing with its axis intersecting the axis of said intermediate shaft, meshing gears on said intermediate shaft and said spindle for driving one from the other, and means for rotating said hollow shaft.

6. In a machine for casting hollow articles, conveying means, an inner shaft restrained against free rotation with respect to the conveying means, a sleeve around said inner shaft, said sleeve being mounted for free rotation with respect to said conveying means, a structure supported by said sleeve for rotation therewith, stub shaft means rotatably supported in said structure in non-parallel relationship with said inner shaft, interengaging gear means fixed to said inner shaft and said stub shaft to cause rotation of said stub shaft about its own axis upon rotation of said sleeve with respect to said conveyor means while simultaneously allowing bodily rotation of said stub shaft together with said structure around the axis of said sleeve, drive means carried by said conveying means and engageable and disengageable with said sleeve to rotate said sleeve with respect to said conveying means when said drive means is engaged with said sleeve, and said inner shaft including a shaft extension coupled thereto and interposed between said inner shaft and said interengaging gear means, said structure supported by said sleeve supporting said shaft extension at a divergent angle to said inner shaft and supporting said stub shaft at a divergent angle to said shaft extension.

References Cited in the file of this patent
UNITED STATES PATENTS

| | | |
|---|---|---|
| 1,341,670 | Powell | June 1, 1920 |
| 1,990,260 | West | Feb. 5, 1935 |
| 1,998,897 | Kay | Apr. 23, 1935 |
| 2,222,266 | Rubissow | Nov. 19, 1940 |
| 2,464,721 | Rubissow | Mar. 15, 1949 |
| 2,583,955 | Lawson | Jan. 29, 1952 |
| 2,603,836 | Rempel | July 22, 1952 |
| 2,681,472 | Rempel | June 22, 1954 |
| 2,834,986 | Bailey et al. | May 20, 1958 |